United States Patent
Bowers et al.

(10) Patent No.: US 7,353,508 B2
(45) Date of Patent: *Apr. 1, 2008

(54) METHOD, APPARATUS AND ARTICLE FOR GENERATION OF DEBUGGING INFORMATION

(75) Inventors: Antony Bowers, Bristol (GB); Richard Shann, Chepstow (GB)

(73) Assignee: STMicroelectronics Limited, Bristol (GB)

( * ) Notice: Subject to any disclaimer, the term of this patent is extended or adjusted under 35 U.S.C. 154(b) by 587 days.

This patent is subject to a terminal disclaimer.

(21) Appl. No.: 10/206,381

(22) Filed: Jul. 26, 2002

(65) Prior Publication Data

US 2003/0140338 A1 Jul. 24, 2003

(30) Foreign Application Priority Data

Jul. 26, 2001 (EP) ................................... 01306398

(51) Int. Cl.
*G06F 9/44* (2006.01)
(52) U.S. Cl. ...................................... 717/162; 717/124
(58) Field of Classification Search ................ 717/107, 717/151, 153, 159, 162–167, 124, 51; 713/2, 713/23
See application file for complete search history.

(56) References Cited

U.S. PATENT DOCUMENTS

| | | | | |
|---|---|---|---|---|
| 5,303,380 A | * | 4/1994 | Tenny et al. ................. | 717/162 |
| 5,642,514 A | * | 6/1997 | Peckham ...................... | 717/144 |
| 6,219,830 B1 | * | 4/2001 | Eidt et al. .................... | 717/139 |
| 6,684,394 B1 | * | 1/2004 | Shann ........................ | 717/162 |
| 6,687,899 B1 | * | 2/2004 | Shann ........................ | 717/162 |
| 6,704,928 B1 | * | 3/2004 | Shann ........................ | 717/162 |
| 6,795,963 B1 | * | 9/2004 | Andersen et al. ........... | 717/130 |
| 6,802,060 B1 | * | 10/2004 | Shann ........................ | 717/162 |
| 6,859,932 B1 | * | 2/2005 | Shann ........................ | 719/331 |

(Continued)

FOREIGN PATENT DOCUMENTS

EP         1 085 410       *   3/2001

(Continued)

OTHER PUBLICATIONS

TIS Committee "DWARF Debugging Information Format Specifications" May 1995.*

(Continued)

*Primary Examiner*—Meng-Al T. An
*Assistant Examiner*—Jason Mitchell
(74) *Attorney, Agent, or Firm*—Lisa K. Jorgenson; Robert Iannucci; Seed IP Law Group PLLC

(57) ABSTRACT

Call frame information is used by debugging software. It records how to restore the parent stack frame at any point during execution of a program. It is normally generated during compilation and stored in the executable in a compressed format, consisting of sequences of instructions that describe how the current call frame changes during execution of each function. Described herein is a means of generating call frame information at link time, using linker macro calls generated by a small set of assembler macros.

20 Claims, 7 Drawing Sheets

U.S. PATENT DOCUMENTS

| | | | |
|---|---|---|---|
| 6,874,140 B1 * | 3/2005 | Shupak | 717/131 |
| 6,901,584 B2 * | 5/2005 | Shann | 717/140 |
| 7,127,711 B2 * | 10/2006 | Shann et al. | 717/162 |
| 2002/0124242 A1 * | 9/2002 | McGoogan et al. | 717/165 |
| 2002/0170041 A1 * | 11/2002 | Shann | 717/141 |
| 2003/0140338 A1 * | 7/2003 | Bowers et al. | 717/162 |

FOREIGN PATENT DOCUMENTS

| | | |
|---|---|---|
| EP | 1 085 411 A2 | 3/2001 |

OTHER PUBLICATIONS

Apple Computer, Mac OS Runtime Architectures, 1996-97, Apple Computer, Inc., pp. 1-44.*

TIS Committee "DWARF Debugging Information Format Specification" May 1995.*

"Tool Interface Standard (TIS) Portable Formats Specification, V1.1," *Intel Corporation*, Mt. Prospect, IL, USA, Oct. 1993, XP-002185992.

Levine, J., "Linkers and Loaders," *Morgan-Kauffman*, ISBN 1-55860-496-0, Oct. 1999, XP-002185993.

* cited by examiner

METHOD, APPARATUS AND ARTICLE FOR GENERATION OF DEBUGGING INFORMATION

BACKGROUND OF THE INVENTION

1. Field of the Invention

The present invention relates to a method of forming an executable program from a number of object code modules and generating associated debugging information.

2. Description of the Related Art

Generally speaking, a single executable program is formed by linking a number of object code modules using a software tool called a linker. Object code modules are usually generated from program source code modules, these modules being written in a high level language. An assembler/compiler reads each source code module and assembles and/or compiles the high level language of the source code module to produce an object code module. The assembler also generates a number of relocations that are used to combine the object code modules at link time in a linker.

An example of a linker standard is ELF (executable linking format). This standard defines a convention for naming relocations belonging to a given section, e.g., rela.abc is relocation section of section .abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched.

As is also known, extra information associated with the executable program, but not directly part of it, may be included in the program. One example of such information is debugging information called Call Frame Information (CFI). CFI records how to restore the parent program stack to the state it was in before a particular function was executed by the parent program. This aids in the debugging of the parent program. CFI is normally generated dung compilation and stored in the executable parent program.

The fact that the CFI is generated during compilation, that is before linking, means that it is not possible to perform patching of the section data to optimize the executable program code because such patching could change the location of a set of section data so that the CFI that is relevant to that set of section data is no longer associated with the correct location and is thus no longer of any use.

BRIEF SUMMARY OF THE INVENTION

It is therefore an aim of embodiments of the present invention to provide a method of linking a number of object code modules to form an executable program with CFI but such that patching can be implemented.

According to one aspect of the invention there is provided a method of linking a plurality of object code modules to form an executable program, each object code module comprising sets of section data and associated section data relocation instructions, at least one of said modules further comprising a macro section containing information sequences associated with one or more of said sets of section data and macro relocation instructions associated with said macro section, wherein said section data relocation instructions include at least one divert macro call relocation instruction identifying a location of one of said information sequences in said macro section, the method comprising, at link time, reading said sets of section data and section data relocation instructions, executing said relocation instructions on said associated sets of section data to modify said section data to generate program code sequences and inserting said program code sequences into a first portion of said executable program, wherein said method further comprises, on reading a divert macro call relocation instruction identifying the location of said information sequence in the macro section, executing said associated macro relocation instructions on said associated information sequence to modify said information sequence and inserting said modified information sequence into a second portion of said executable program.

According to another aspect of the invention there is provided a method of generating an object code module for linking with other object code modules to form an executable program, the method comprising, generating sets of section data and associated section data relocation instructions, generating a macro section containing information sequences associated with one or more of said sets of section data and macro relocation instructions associated with said macro section, including the step of generating at least one divert macro call relocation instruction identifying a location of one of said information sequences in said macro section, wherein each information sequence in the macro section constitutes skeleton information for generating a set of call frame information instructions for insertion into a debug frame of an executable program.

According to a further aspect of the invention there is provided a linker for linking a plurality of object code modules to form an executable program, each object code module comprising sets of section data and associated section data relocation instructions, at least one of said modules further comprising a macro section containing information sequences associated with one or more of said sets of section data and macro relocation instructions associated with said macro section, wherein said section data relocation instructions include at least one divert macro call relocation instruction identifying a location of one of said information sequences in said macro section, the linker comprising, an instruction reader for reading said sets of section data and section data relocation instructions, means for executing said relocation instructions on said associated sets of section data to modify said section data to generate program code sequences and for inserting said program code sequences into a first portion of said executable program, and wherein said instruction reader comprises means for detecting a divert macro call relocation instruction identifying the location of said information sequence in the macro section, operable to execute said associated macro relocation instructions on said associated information sequence to modify said information sequence and to insert said modified information sequence into a second portion of said executable program.

The embodiment of the invention discussed herein allows users to create call frame information for functions written in assembly language and also allows post-compiled time optimizations to move and omit pieces of code without invalidating the call frame information. The scheme discussed herein generates call frame information at link time, using linker macro calls generated by a small set of assembler macros. The scheme can be implemented with minimal modifications to present tool sets, allows optimal encoding of the call frame information and is reasonably economical with object module space.

BRIEF DESCRIPTION OF THE SEVERAL VIEWS OF THE DRAWING(S)

For a better understanding of the present invention and to show how the same may be carried into effect, reference will now be made by way of example to the accompanying drawings in which.

DETAILED DESCRIPTION OF THE INVENTION

Although reference is made in the following description to the ELF linking standard, it will be understood by those skilled in the art that this is by way of example only and that the embodiments of the present invention are equally applicable to other linker standards.

In particular, reference is made in the following description to macro relocations. These are a new kind of relocation proposed by the present applicants to facilitate in the optimizing of the object modules at link time and are described in the applicants commonly assigned copending UK Application No. 9920911.6. As an aid to understanding the present invention described later in this document the format and use of macro relocations will now be described in relation to the ELF standard.

As described in GB 9920911.6, any object module may contain a macro section, generated in the normal way by the assembler. In addition, the toolchain can supply certain standard macros in the object modules contained in standard libraries. In addition, user written code can include a macro section. The linker does not distinguish between these, it simply merges them altogether in the same way as it merges other section data. Thus, the linker processes an object code module having a set of ordinary sections (e.g., .data, .text, etc.) with associated relocation sections (.relo.data, .relo.text) and a single macro section with its associated .relo.macro section containing macro relocations.

The object module also has a symbol section which contains symbols which identify offsets in the other sections (e.g., .text, .data, macro). Some symbols identify offsets which identify locations inside the macro section, and these symbols can be used as the targets of a macro call relocation. Relocations in the macro relocation section determine which bytes of section data in the macro section, if any, are substituted from the macro section starting from the labeled offset.

Thus, in assembling a number of source code modules according to the ELF standard, the output ELF object contains an ELF header and the sections identified above. The final executable program generated by the linker reading the ELF object will include a number of code sequences from the "normal" sections and a number of code sequences taken from the macro section. In one embodiment, the code sequences taken from the macro section are determinable by conditions resolvable at link time.

Figure 1:
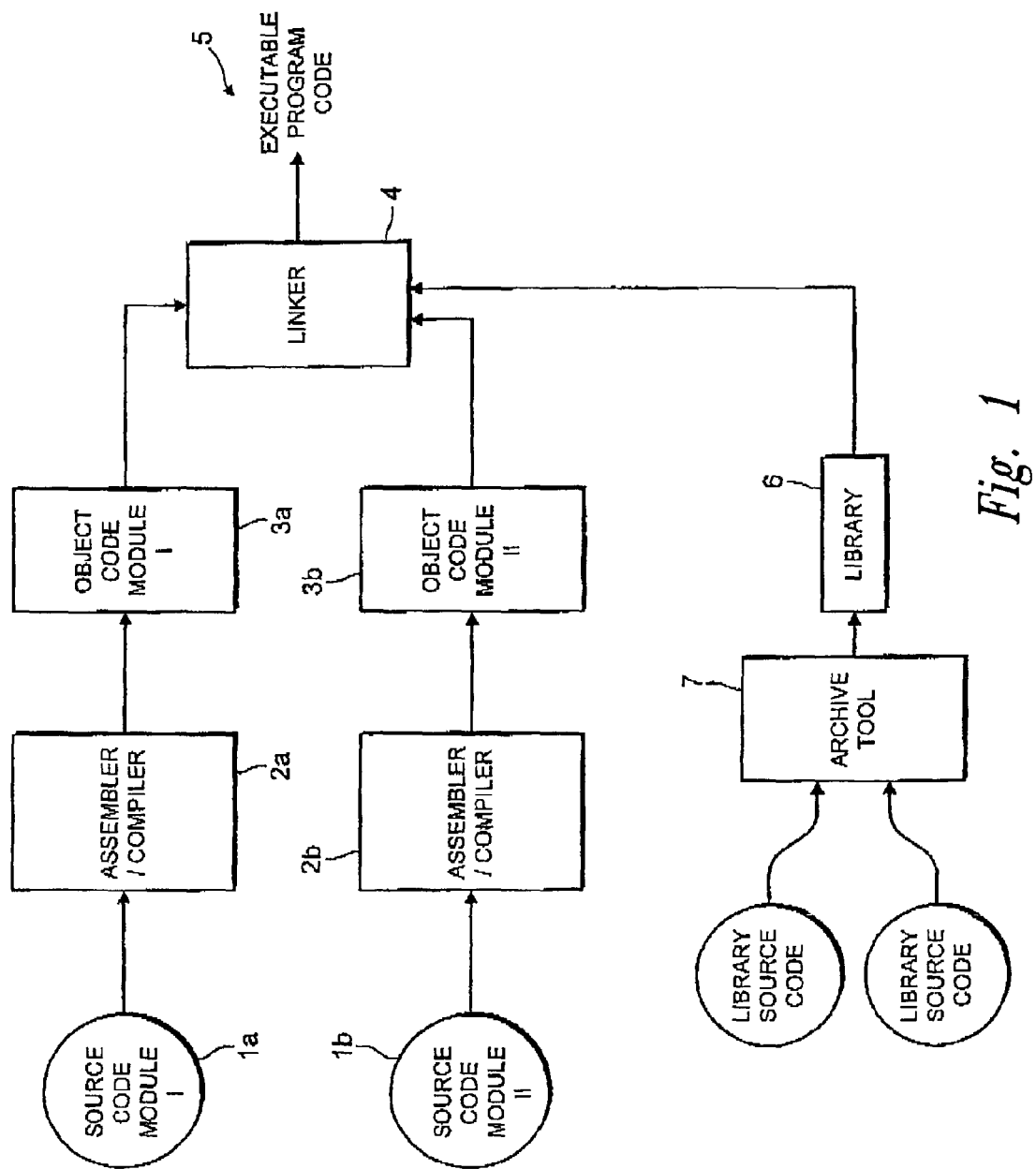
FIG. 1 is a block diagram illustrating the context of the invention.

With reference to FIG. 1, a system 0 such as a computing or processing system (FIG. 3) having circuitry, for example a microprocessor and computer-readable memory, for linking a number of program modules to form a single executable program is shown schematically. The system 0 may take the form of any of a variety of standalone or networked computing systems, including, but not limited to, mainframe, mini-, micro-, or workstation computing systems.

A number of program source code modules 1a,1b, each module written in a high level language, is provided to the system 0. The particular high level language used for each source code module may vary from module to module, or alternatively all of the program source code modules may be written in the same high level language. Each source code module 1a,1b, is input to a respective assembler/compiler 2a,2b which assembles and/or compiles the high level language of the source code module to produce an object code module 3a,3b. Each object code module 3a,3b is the low level language equivalent to each respective source code module 1a,1b, the low level language being a language which is directly readable by a target computer into which the final resulting single executable program is to be loaded. It will be appreciated that a single assembler/compiler could be used to convert a number of source code modules to respective object code modules.

Each object code module 3a,3b is passed to a linker 4. Object code modules may be stored in libraries, such as the library 6 in FIG. 1, placed under the control of an archive tool 7. Access to these object code modules by the linker 4 is explained later. The linker combines all of the respective object code modules 3a,3b to produced single executable programs, still in the low level language suitable for the target processor into which the program is to be loaded.

For a given architecture there are often different instruction sequences for achieving the same objective depending on the values of the operands which are being handled. For example, "load a function address into a register" may be achieved in various ways depending on the address in question. When the operand is unknown before link time there is scope for re-writing the code at link time depending on the value of the operand. This re-writing of the code is a form of optimization termed herein "linker relaxation."

In GB 9920911.6 a scheme is described for achieving linker relaxation based on information written in assembler files and passed to the linker as special relocations. The special relocations are also used for rewriting particular instruction sequences as one of a set of known alternatives.

Each assembler generates an object code module including sets of section data, each set of section data having a set of relocations generated by the assembler to describe how the section data is to be patched so as to render it compatible with other section data to form the program 5. These relocations are generated by the assembler. Section data comprises a plurality of code sequences executable in the final program, and data values to be accessed by the executing program.

In particular a set of "relocations" to enable link time optimization of code is described. Conventionally a relocation describes the patching of section data or instructions with (encoded versions of) symbols. Such relocations are referred to herein as "bit relocations." In addition a number of so-called "special relocations" are discussed herein which are sometimes referred to in the following as "non-bit" relocations to distinguish from conventional "bit" relocations.

Non-bit relocations are defined that describe the calculation of integer values based on the values of symbols and constants passed to the linker. The integer values in the described embodiment are 32 bits long.

Also, a "macro-call" relocation is defined that allows section data (code sequences) to be inserted from a special section (".macro" section) written to contain frequently used idioms. Section data that is to be selectively inserted into a section being optimized by the linker can bethought of as a "link time macro." It is parameterized by symbols with the substitution of the values for the parameters being performed by the linker.

It is assumed that a skilled reader is familiar with the ELF format and so only a very brief description will be given here prior to describing the special relocations.

The ELF (executable and linking format) standard defines a convention for naming relocation sections belonging to a given section. For a section of name .xxx the standard prescribes relocation sections .rel.xxx and .rela.xxx. The structure of these sections is defined and a partial semantic associated with them. Specifically an entry in .rel.xxx has, an offset field—the offset in the .xxx section where the patching is to occur, a symbol field—the symbol whose value is to be patched, and a type field—an otherwise undefined type.

It is the type field that is used to describe the appropriate method of encoding the symbol value into the instruction or data of the .xxx section.

The .rela.xxx section is similarly defined but has an extra field (the addend) with the semantic that the addend is to be added to the symbol value before patching in.

In order to support the special relocations described in GB 9920911.6, a new type of relocation section is defined, with the naming convention .relo.xxx which is specifically intended to support optimizing at link time. In this way the .rel and .rela sections are left free to be used for conventional bit relocations.

Figure 2:
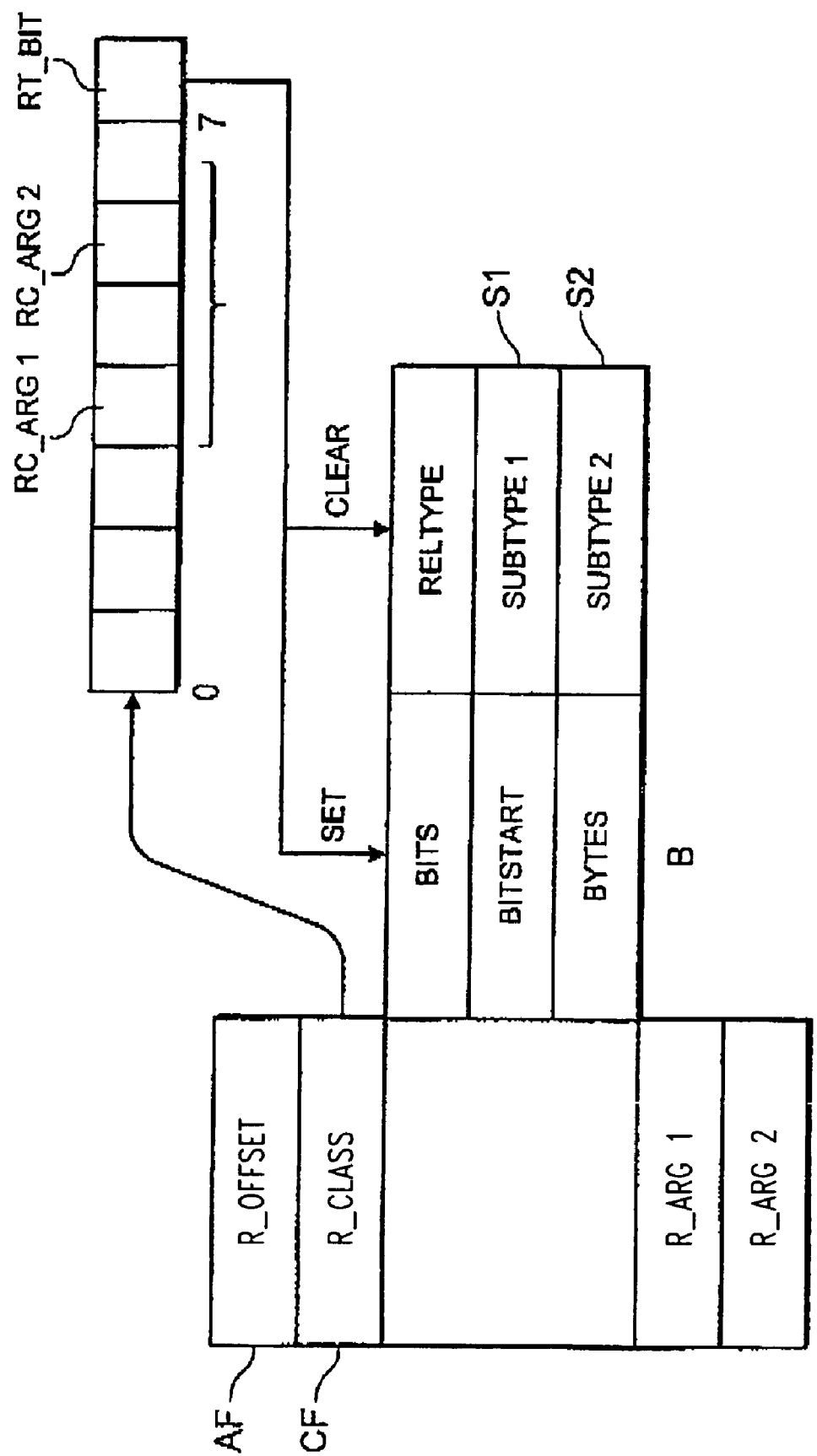
FIG. 2 is a sketch illustrating the layout of the special relocations.

The format of an entry in the relo section is given in Table 4 (it should be read in the context of the 32-bit ELF standard). It is illustrated in FIG. 2.

The underlying structure of the new type has an address field AF (r_offset), a 1 byte classification field CF (r_class), and two one word arguments (r_arg1; r_arg2). Non-bit (NB) relocations also have 3 information fields which are labeled reltype, S1,S2 (1 byte each) whilst bit (B) relocations have 3 information fields which are labeled bit, bitstart, and bytes. The definition of these information fields is as follows:

| i. r_offset | The location at which to apply the relocation action. (That is, if this is the .relo.xxx section, then r_offset is the offset in the .xxx section where the relocation applies.) |
|---|---|
| ii. r_class | The classification byte indicates the type of relocation (bit or non-bit), and also conveys information about the use of the remaining fields. In the classification byte, bit 7 RT_BIT indicates a bit relocation if set (in which case the B fields apply) or non-bit relocation if clear (in which case the NB fields apply). Bits 3-6 specify whether the r_arg 1, 2 fields are a symbol index or a value. Table 1 (shown below) defines how the bits specify the interpretation of the r_arg 1, 2 fields. |

TABLE 1

| Name | RC_ARG1 | Meaning |
|---|---|---|
| RC_PARAM | 3 | r_arg1 is param |
| RC_VAL | 2 | r_arg1 is value |
| RC_SYM | 1 | r_arg1 is symbol |
| RC_UNUSED | 0 | r_arg1 is unused |

| iii. r_arg1, 2 | The interpretation of these fields depend on bits 3-6 of the r_class field. Two bits RC_ARG1, RC_ARG2 are associated with each of r_arg1 and r_arg2. For bit relocations these two fields are normally used as symbol and addend. |
|---|---|

For non-bit relocations the fields r_arg1,2 hold constant data being passed with a non-bit relocation. As with bit relocations, bits 6 and 5 say whether they hold a symbol index or a value. The actual use of any symbol or value passed with a non-bit relocation depends on the non-bit.reltype field. This may be an absolute value representing things such as alignment, register numbers, etc. The semantics are given in the table of relocation types in Table 5.

The bit (B) type fields:

| iv. r.bit.bits | The number of bits that are to be patched. A lower case "b" is used to indicate this quantity in the name of a relocation. |
|---|---|
| v. r.bit.bitstart | The least significant bit to be patched. A lowercase "s" is used to indicate this quantity in the name of a relocation. |
| vi. r.bit.types | The size of the object being patched. This is needed for big endian targets in order to find which byte the least significant bit is to be found in, and where the higher order bits are. An uppercase "B" is used to indicate this quantity in the name of a relocation. |

Note that the following notation is used to name the bit relocations:

R_b<val>s<val>B<val> where <val>'s represent the number of bits, start bit and number of bytes as specified by the r.bits, r.bitstart, r.bytes fields.

For example R_b16s0B4 will patch the least significant two bytes of a four-byte object. This will be the bytes at offsets 0,1 or 4,3 depending on the target endianness.

The non-bit (NB) type fields:

| | |
|---|---|
| vii. r.nonbit.reltype | This field describes what sort of action the linker must perform. These include such things as executing an operation on the linker's internal stack of values, storing parameters to macros, conditionally deleting section data etc., as described in more detail later. |
| viii. r.nonbit.subtype1,2 (S1,S2) | These fields hold values whose interpretation depends on the reltype field, and bits 3 to 6 of the classification field. |

Figure 3:
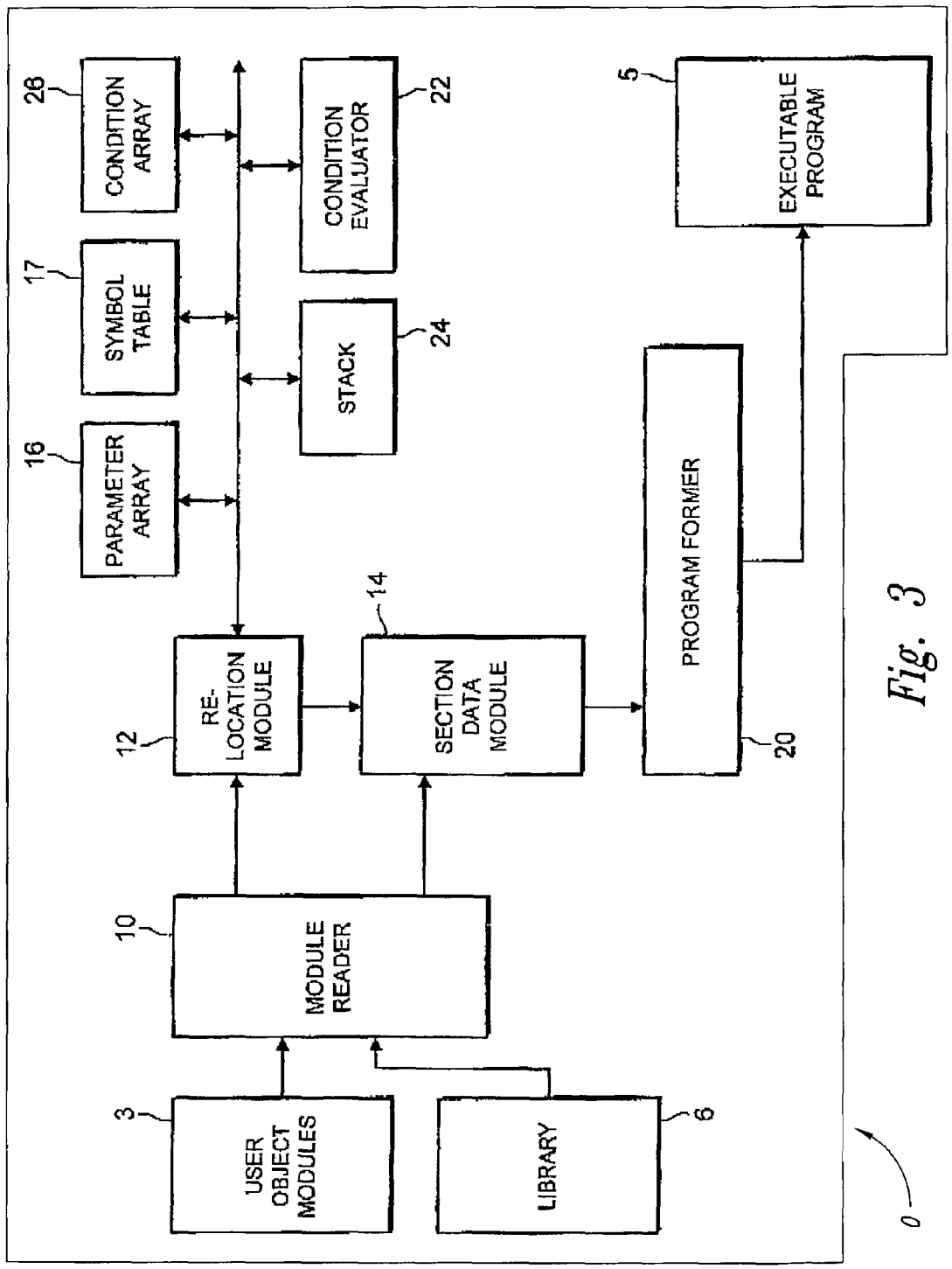
FIG. 3 is a block diagram of a linker portion of a computing system.

The above-described new type of relocation section supports a number of special relocations which allow a number of different functions to be performed by the linker. FIG. 3 is a block diagram of components of the linker which will be used to describe these additional functions. It will be appreciated that in practice the linker can be constituted by a suitably programmed microprocessor. It will be understood therefore that the schematic blocks shown in FIG. 3 are for the purposes of explaining the functionality of the linker.

The linker comprises a module reader 10 which reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and/or the library 18 depending on the actions taken by the relocation module 12 and forms the executable program 5 which is output from the linker 4. The linker also includes a condition evaluator 22 which operates in conjunction with a stack-type store 24. The condition evaluator reads the value of the top entry of the stack 24.

The linker also implements three arrays or tables as follows, a parameter array 16, a symbol table 17, and a condition array 26.

Before describing more specifically each of the above new relocations, the basic operation of forming an executable by a linker is summarized below. The basic operation comprises:

1. copying sections from input modules to same-name sections in the output executable, and
2. patching sections following the relocations in their corresponding relocation sections. This includes deleting code sequences from the module (caused by an assembler directive LT_IF, discussed later) and inserting code sequences (caused by a macro call, also discussed later).

After step 1, all the branches of the LT IF ... LT_ENDIF assembler directives are present in the executable, and the linker is only concerned with deleting unwanted sequences. In the case of link time macro calls, at step 2, it inserts section data from the .macro section (discussed later), deleting the requisite marker bytes. The macro section will itself be subject to the same step 2, each time a macro insertion is required.

Link Time Calculations

The first special relocation type which will be described allows arbitrary calculations to be passed to the linker by way of a number of special relocations which are defined by the reltype field of the new relocation format ELF32_relo. These relocations are numbered 6-29 in Table 5.

The set of the special relocation types listed in Table 5 allow the linker to support a general-purpose stack based calculator. These relocations allow the value of symbols and constants to be pushed on the stack 24 and a designated manipulation to be performed. With the bits RC_ARG1 in the class field CF set to RC_UNUSED (see Table 1), binary operators act on the top two stack entries. Otherwise, the value passed and the top of stack (tos) entry are used. Unary operators operate on the top of the stack 24 (tos). Both pop their operands and place the result on the top of the stack. The full definition of the relocation types to support this is given in Table 5. There follows examples of their use.

Patch Symbol Plus Addend in 16-bit Target Integer

Figure 4:
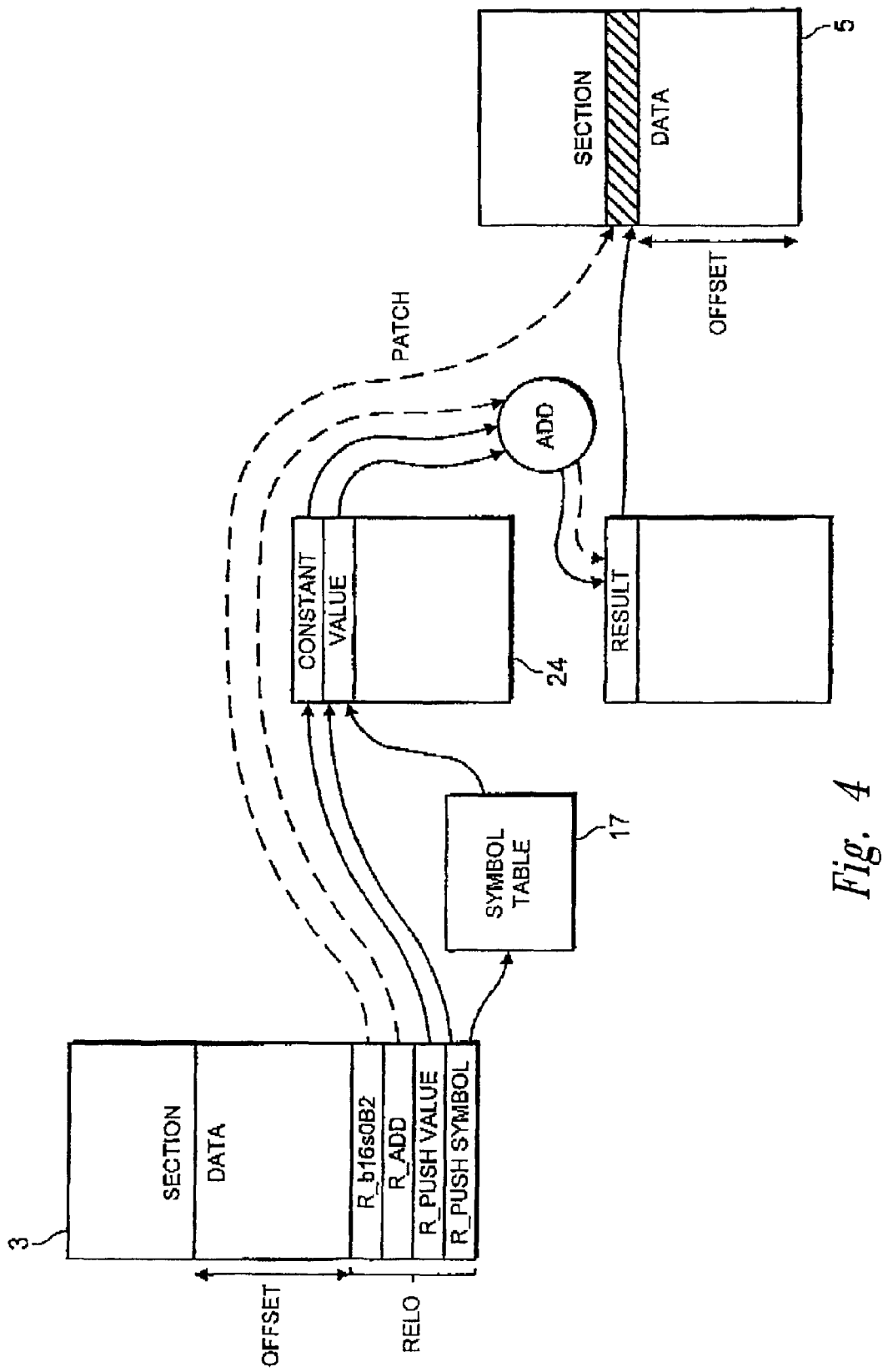
FIG. 4 is a schematic diagram illustrating one example of the use of special relocations to implement calculations.

This could be accomplished by the following ordered sequence of relocations. The effect of the sequence is illustrated schematically in FIG. 4. FIG. 4 illustrates section data and its accompanying set of relocations forming part of an object code module 3. The relocations will be read in order from the bottom in FIG. 3. The listed relocations are:

| | |
|---|---|
| R_PUSH symbol | (a relocation to push value of symbol on stack) |
| R_PUSH value | (a relocation to push constant value on stack) |
| R_ADD | (pop top two values off stack add them and push result back) |
| R_b16s0B2 | (patch the value popped from the top of stack into the section data, 16 bits are to be patched, starting at bit 0, in target object two byte wide) |

All the relocations have the same offset (the offset of the integer to be patched in the section). The result of the patch is shown in the section data which forms part of the executable program 5.

The above relocations are implemented as described in the following with reference to FIGS. 3 and 4. The section data and relocations are read by the module reader 10. The section data is applied to the section data module 14 and the relocations are applied to the relocation module 12. The relocation module considers the first relocation, in this case R_PUSH symbol and acts accordingly to read the required value of the identified symbol from the symbol table 17 and push it onto the stack 24. The subsequent relocations are read, and the necessary action taken with respect to the stack as defined above. Finally, the last bit relocation R_b16s0B2 patches the final result value from the stack 24 into the 16-bit target integer. This patched section data is held in a section data module 14 ready for inclusion in the final program at the program former 20 unless, of course, some later relocations make further modifications prior to completion of linking.

As a short-hand any operator can be accompanied by a symbol as one of its operands (the left hand operand in the case of binary operators). In that case the following sequence could be used:

| | |
|---|---|
| R_PUSH value | (relocation to push value on stack) |
| R_ADD symbol | (pop top add the value of the symbol and push back the result) |
| R_b16s0B2 | (patch section data, 16 bits, starting at bit 0, in target object two bytes wide) |

Although the above are given as examples of use of the stack calculator in the linker, the stack calculator is not actually needed for this calculation since both a symbol and a value could be passed in one normal bit relocation. All that is needed in this case is:

R_b16s0B2 symbol value.

Nevertheless the example illustrates how the special relocations support a stack-based calculator at the linker.

The top of stack can also be used for conditional linker relocations as described later. For example, to include section bytes if a symbol has more than 8 bits we could use:

R_PUSH symbol
R_PUSH 0xffff_ff00
R_AND
R_IF (the above relocations all have the address field r_offset set equal to the start of the section bytes to be conditionally included)

| | |
|---|---|
| R_ENDIF | (with the address field r_offset set equal to end of section bytes to be included+1), |

(R_ENDIF is discussed later)

The relocation R_PUSH can have a number of different effects. With the bits RC_ARG1 set to RC_SYM (i.e., the r_arg1 field acts as a symbol index), the field s1 holds a value to indicate what part of symbol information is to be pushed on the stack. The value held in the s1 field is indicated in Table 2.

TABLE 2

| Name | Meaning | Value |
|---|---|---|
| SF_NAME | st_name | 1 |
| SF_VALUE | st_value | 2 |
| SF_SIZE | st_size | 3 |
| SF_INFO | st_info | 4 |
| SF_OTHER | st_other | 5 |
| SF_INDEX | st_shndx | 6 |

Different macro parameter types (MPT) can be passed with the R_PUT_PARAM and R_GET_PARAM relocations. They enable type checking of the macro call parameters, and allow the linker to distinguish symbol indexes from values. MPT_VALUE denotes a constant value and is denoted by value 0 in the s2 field.

MPT_SYMBOL denotes a symbol index and is denoted by value 1 in the s2 field.

For a processor having two instruction modes, this artifact can be used to denote the mode of instruction that the symbol labels. Thus, the R_PUSH_ST_OTHER is used to detect at link time if a symbol is mode A or mode B code. The assembler sets s1 to mask off the STO_MODE_A bit in the symbol's st_other field. The linker pushes the bitwise AND of s1 and the st_other field on the internal linker stack. This can be used by the linker conditional relocations to insert the appropriate calling sequences.

At link time the relocation module 12 makes multiple passes over the section's relocations recording which conditional passages are included. These are held in the section data module 14 while the condition evaluator 22 evaluates the condition by examining the top of stack. The conditions for inclusion are based on the values of symbols and, since some of these will be forward references to labels in the same section, the result of a given conditional expression may change on the next pass. For this reason multiple passes are required until no more changes are needed.

In order to support the conditional section relocation, a number of new Assembler Directives are required as follows. These cause certain special relocations to be issued as described later.

| | |
|---|---|
| LT_IF expr | Marks the start of a block of section data to be conditionally deleted. The condition is that expr should evaluate non-zero. The assembler issues the stack manipulation relocation 6-29 in Table 5 to push expr on the linker stack 24 and an R_IF relocation. |
| LT_ELSE | Marks the start of block of section data to be conditionally inserted/deleted. The condition is the previous LT_IF at the same level of nesting evaluated as zero. The assembler issues an R_ELSE relocation. |
| LT_CONDITION condition_name expr | The assembler issues the relocations to calculate the expr (that is, expr is on top of the stack). If condition_name has already appeared in an LT_CONDITION directive then the index associated with it is re-used. Otherwise the next unused index is chosen (initially 0). The assembler then issues R_STORE with that index. In this way, the condition array 26 can be constructed. After the condition name has been associated with an index in this way it can be used in an expression in place of a constant or symbol. When used, the assembler issues R_FETCH with the index associated with condition_name. That index is used to address the condition array 26. The scope of condition_name is the section where the LT_CONDITION directive occurs, from its point of first occurrence. |

-continued

| | |
|---|---|
| LT_ENDIF | Marks where normal linker processing re-starts after an LT_IF/LT_ELSE/LT_IF_FIXED (described later) directive. The assembler issues an R_ENDIF relocation. |

The following are the special relocations used to support conditional section data deletions, which are issued by the assembler responsive to the conditional Assembler Directives.

| | |
|---|---|
| R_IF | Causes the top entry to be popped from the linker's stack of values. If the value is zero then section data is skipped and the succeeding relocations are ignored until R_ELSE/R_ENDIF is encountered. If the value is non-zero then relocations are processed and instructions are not deleted until R_ELSE/R_ENDIF is encountered. |
| R_ENDIF | Defines the end of the relocations subject to the R_IF relocation, and of section data to be conditionally deleted subject to the R_IF relocation. |
| R_ELSE | If this is encountered while section data is being taken then section data is skipped and the succeeding relocations are ignored until R_ENDIF is encountered. If encountered while skipping due to R_IF then relocations are processed and instructions are no longer deleted until R_ENDIF is encountered. |
| R_STORE index | A value is popped from the linker's stack of values. It is put in the condition array 26 kept by the linker for this purpose. The value is stored at the index passed with the relocation (in the nonbit.subtype field). This relocation avoids the overhead of passing the same calculation to the linker many times over. |
| R_FETCH index | A value is pushed on the linker's stack of values. The value pushed is the value in the condition array 26 at the index passed with the relocation. |

Link Time (LT) Macros

Reference will now be made to FIGS. 3-6 to describe link time macros. Link time macros contain parameterizable code sequences M1,M2, etc. that are presented to the linker just once, in a section of the object code module reserved for this purpose. This section has the name macro pre-defined for it. Code for the .macro section is created by the assembler exactly as for other sections from user written source code. The .macro section provides code sequences which may optionally be included in the final program. As mentioned earlier, the most useful optimizations may be stored in .macro sections in object files in the standard library 6 delivered with the toolchain. The macro code extends the possibilities for optimization. Associated with each macro section .macro is a relocation section (.relo.macro) MR which contains the relocations generated by the assembler for the macro section. A .relo.macro section can contain relocations that patch in parameters to its macro section. It also contains relocations which determine conditions to establish which macro code sequences are included in the final executable program. The object code module includes a symbol section holding symbols which allow values to be accessed by relocations.

As a matter of terminology we will call relocatable sections which are not the .macro section ordinary sections. One such section is labeled section.xxx 110 in FIG. 6. It includes alternative code sequences labeled O1,O2 in FIG. 5, each with an associated relocation R1,R2,R3 in the relocation section .relo.xxx 111.

Link time macros are created by a programmer and included in the source code module. A link time macro is invoked by naming a symbol defined in the .macro section 112 at the inserting location IL in the ordinary section .xxx where the optimizable sequence is required. The parameters are also specified. These are done by two relocations R_PUT_PARAM and R_MACRO_CALL discussed later which are generated by the assembler. Invocation of a macro section by the assembler is achieved by generating the macro call relocation R_MACRO_CALL<symbol> in the ordinary section relocations, e.g., before R1 in FIG. 5. In one embodiment, the assembler also plants a marker byte MB at the insertion location IL in the section data thus ensuring that the inserted code sequences have a distinct address.

Figure 5:
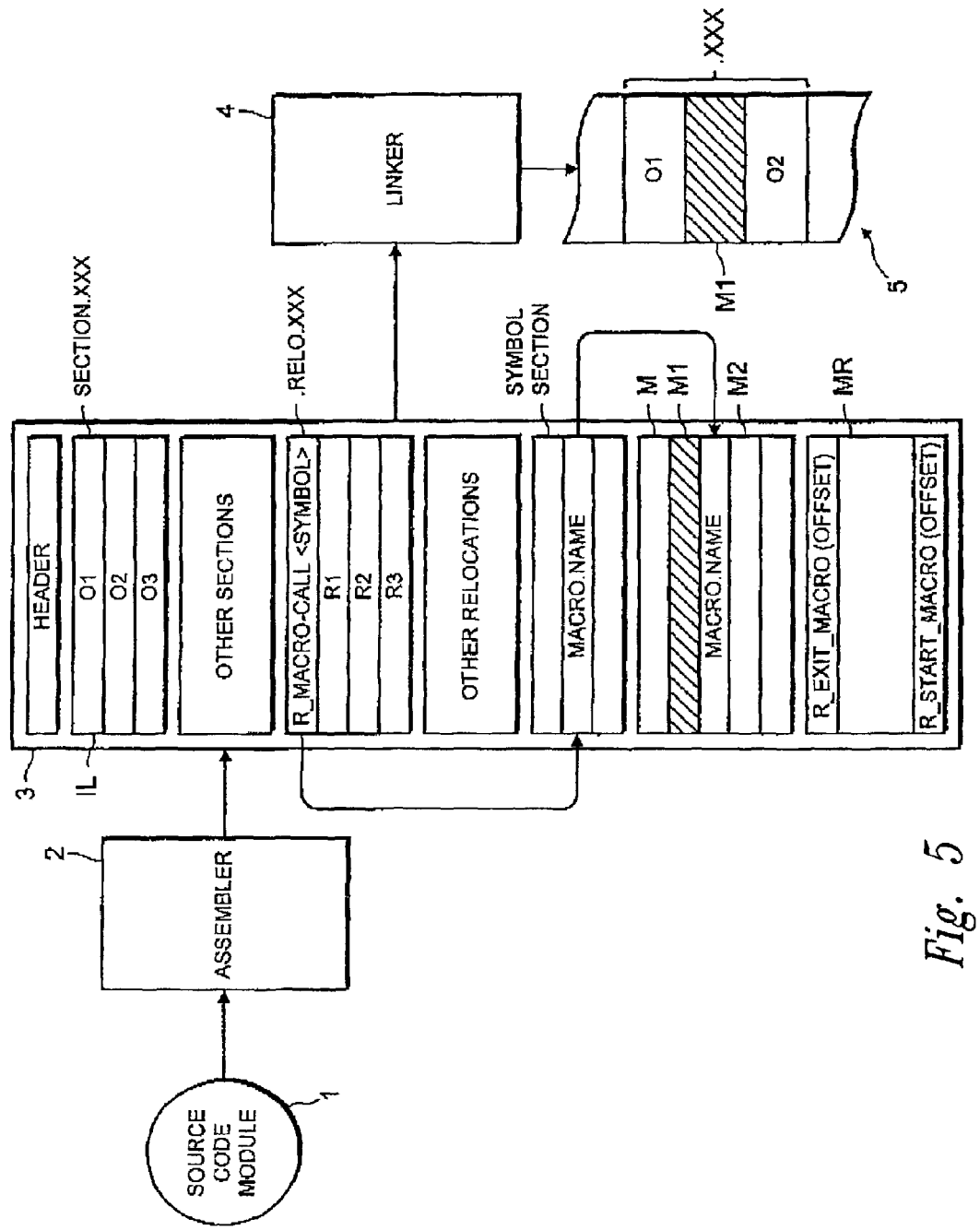
FIG. 5 is a diagram showing the use of macro sections.

The linker 4 implements a macro call relocation by opening the macro section M and its related .relo.macro section MR 113. The symbol identified in the macro call relocation accesses the symbol section which holds at that symbol an offset identifying a location in the macro section. The relocation module 12 first locates this offset in the object code module 3 and verifies that there is a link time macro starting at that offset with the correct macro name. In FIG. 5, M1 is specified. The relocation module 12 then traverses the .relo.macro section starting at the R_START_MACRO until it encounters the end of macro relocation R_EXIT_MACRO. The macro section includes a number of alternative code sequences, each associated with conditional expressions embodied in the relocations in the MR section. The linker skips over any code sequences (and associated relocations) for which conditional linker expressions evaluate as false (as described earlier). Code sequences not skipped are to be inserted in the ordinary section replacing the marker byte(s) MB. Before being inserted these .macro section bytes will be relocated themselves, taking into account their destination address in the ordinary section. If the same link time macro is invoked at multiple locations in the ordinary section, then that part of the .macro section will be relocated multiple times with different values for the program counter at the start of the macro sequence depending on where it is being inserted in the ordinary section.

Linker optimization involves multiple passes over the relocations since the value of symbols change as code is inserted, and some symbols will be forward references. Those that are forward references will change, and so invalidate any uses of that symbol earlier in the same pass. For this reason it is necessary to continue making passes through the ordinary section applying relocations until the values of the symbols have stabilized.

The effect of this after linking is to provide in the final executable program 5 at the marked location IL in the ordinary section data .xxx a set of the macro code sequences 5 (e.g., M1 in FIG. 5) drawn from the macro in the .macro section between the offset identified in an R_START_MACRO relocation and that specified in the R_EXIT_MACRO relocation.

In order to support link time macros, a number of new Assembler Directives are required as follows. These cause macro sections and macro relocations to be invoked as described later.

The meaning of the macro invocation is that a LT selected sequence of instructions is to be inserted by the linker at this point in the code. LT macro invocation is allowed only in ordinary sections.

The integers maxbytes, align, optionally passed in the macro call, enable error checking between the macro call and its instantiation. They are encoded into the subtype fields of the R_MACRO_CALL relocation. They are also used by the assembler to determine the maximum number of bytes that the macro call will generate, and the alignment (i.e., any guarantees about the low order bits of the macro length being zero). The integer sched_info must match any

| In the macro section | |
| --- | --- |
| LT_IF_FIXED | As LT_IF except that instead of passing a Boolean expression expr, the condition is internal to the linker optimization process. The condition is normally false but becomes true when the linker requires a fixed length insert. The assembler issues an R_IF_FIXED relocation. |
| LT_DEFMACRO | macro_name(<param_type>param name[,<param_type>param name])[:maxbytes[:align[:sched_info]]] This directive introduces a link time macro definition. The macro_name should be the label at the first instruction of the macro body. The param_names are the formal parameters used in the body of the macro. The assembler emits R_GET_PARAM for each occurrence of a formal parameter in an expression in the body of the macro. The param_type associated with the formal parameter is passed with the relocation R_GET_PARAM. The assembler emits R_START_MACRO at this point. The integers maxbytes and align (or zero if they are absent) are encoded in the subtype fields of the R_START_MACRO relocation. The sched_info field is used by the assembler for optimizing. This value is passed in the r_arg1 field and any value mismatch between the call and caller is reported by the linker unless sched_info is zero. |
| LT_ENDMACRO | Marks the end of the macro body. The assembler emits R_EXIT_MACRO at this point. |
| In ordinary sections | |
| LT_DECLMACRO | macro_name(<param_type>[,<param_type>])[:sched_info] The name of the macro and the types of the parameters that it expects are given in the directive. The link time macro name hides any mnemonic of the same name and is hidden by any assembler macro of the same name. The R_MACRO_CALL relocation is issued. The value sched_info is passed in the r_arg2 field of the macro call relocation (0 if not specified). As an alternative to macro code being written in the object code module itself, it can be supplied in an object file within the toolchain library 6. A link time (LT) macro invocation is signaled to the assembler by the syntax: macro_name[param[,param]. . . ][:maxbytes[:align[:sched_info]]] For each parameter the assembler emits a relocation R_PUT_PARAM for the parameter with index values 0, 1, . . . , etc. The assembler then emits the R_MACRO_CALL relocation with the symbol macro_name. | value given in the corresponding declaration. It is passed to the linker in the r_arg2 field. It contains architecture specific information about the kind of instructions contained in the macro (used by the assembler for scheduling). A value of zero for any of these means no information is provided, and link time checking is turned off.

| | Relocations for .macro Sections |
|---|---|
| R_IF_FIXED | This is like R_IF except that instead of popping a value from the stack, the condition is whether the linker is attempting to optimize. The linker will not be attempting to optimize if the code is marked as not optimizable, or if after several passes the macro is oscillating in size. For this purpose the linker maintains a condition flag. |
| R_START_MACRO | The linker seeks this relocation at the offset labeled by the macro name (relocations prior to this one are not processed). It is an error for this macro to appear more than once at one offset in a .macro section. |
| R_GET_PARAM index | This relocation conveys in its r.nonbit.subtype 1 field s1 an index for accessing the parameter array 16. The linker reads the index'th parameter from its parameter array 16. The interpretation of this parameter depends on the RC_ARG1 bit in the r_class field (see Table 3). If this is set, then the parameter is an index into the symbol table 17 and the symbol's value is pushed on to the linker's stack 24 of values. Otherwise the value itself is pushed. In all cases the nonbit.subtype2 field s2 is checked for type mis-match with the value stored in the parameter array at the index passed. |
| R_EXIT_MACRO | The linker stops inserting bytes/processing relocations from the .macro section. It discards the parameter array and then the macro invocation terminates. |
| | Relocations for Ordinary Sections |
| R_PUT_PARAM index | An index is passed in the r.nonbit.subtype 1 field s1. The value in the r_arg1 field is stored by the linker in the parameter array 16 at this index. The linker also stores the value of the r.nonbit.subtype2 field s2 of this relocation along with the parameter. This enables the linker to perform type checking when R_GET_PARAM is encountered. |
| R_MACRO_CALL symbol | The symbol specifies an offset in the .macro section. The relocations in .relo.macro are traversed from the R_START_MACRO at that offset until R_EXIT_MACRO is processed. Section data from the .macro section are inserted in the section at the location of the R_MACRO_CALL relocation. This relocation is only found inside relocation sections of ordinary sections. Generally multiple passes are required through the relocations for values to stabilize. The linker will store the current number of bytes patched by the R_MACRO_CALL relocation with that relocation. There may be circumstances where the optimization would not terminate because of a macro relocation oscillating in size indefinitely. If this happens the linker will start patching such macros with the condition "fixed size" true, so that the number of bytes patched-in stays constant from one pass to the next. The fixed size condition is checked for by the R_IF_FIXED relocation. |
| R_SUBSTITUTE symbol value | The symbol specifies an offset in the .macro section. The relocations in the .relo.macro are traversed from the R_START_MACRO at that offset until R_EXIT_MACRO is processed. Section data from the macro section are inserted at the location of the R_MACRO_CALL relocation replacing value bytes of the ordinary section. |

There follows an example of how to write a link time macro. The parts in the FIXED FONT are the actual sample assembler file for a link time macro. In between is commentary in normal font.

a) SECTION .macro

A link time macro is defined by the directive LT_DEFMACRO, for example a macro with a symbol parameter would be defined:

LT_DEFMACRO const_load(.SYM s)

The name of the macro must label the start of the sequence of instructions to be inserted and be exported, thus:

EXPORT const_load
const_load:

Directives are written to instruct the linker to insert some of the subsequent instructions until the LT_ENDMACRO directive is reached. The alternatives are selected by expressions involving the parameters to the macro.

For example:

```
LT_IF(s=<0xFFFF)
 MOVI s,Rϕ
LT_IF_FIXED
```

```
 NOP; to pad out the code to a fixed length when not optimizing
 LT_ENDIF
LT_ENDIF
LT_IF (s>0xFFFF)
 MOVI(s>>16),Rϕ
 SHORI(s&0xFFFF),Rϕ
LT_ENDIF
LT_ENDMACRO
```

From an ordinary section the link time macro would be declared to the assembler and then invoked as follows:

```
SECTION .text, AX
LT_DECLMACRO const_load(.SYM); declaration of the macro and its
   parameter type. For a symbol the type is MPT_SYMBOL.
IMPORT fred;fred is unknown until link time
...
const_load fred; call link time macro to load value of symbol fred into
   register R0. The assembler emits a single marker byte into the
   section data.
```

It is instructive to write out this example with the assembler generated Elf side by side, see Tables 3 and 4.

TABLE 3

| Assembler source | Relocations generated in .relo.macro |
| --- | --- |
| SECTION .macro | .macro and .relo.macro sections are created |
| LT_DEFMACRO const_load (.SYM s) | R_START_MACRO |
| EXPORT const_load const_load: | const_load is put in the Elf symbol table as global |
| LT_IF (s=<0xFFFF) | R_PUSH 0xFFFF |
|  | R_GET_PARAM index=0 type=MPT_SYMBOL |
|  | R_LE |
|  | R_IF |
| MOVI s, Rϕ | (program counter advances) |
|  | R_GET_PARAM index=0 type=MPT_SYMBOL |
|  | R_b16s5B4 |
| LT_IF_FIXED | R_IF_FIXED |
| NOP | (program counter advances) |
| LT_ENDIF | R_ENDIF |
| LT_ENDIF | R_ENDIF |
| LT-IF (s>0xFFFF) | R_PUSH 0xFFFF |
|  | R_GET_PARAM index+0 type=MPT_SYMBOL |
|  | R_GT |
|  | R_IF |
| MOVI (s>>16) Rϕ | (program counter advances) |
|  | R_GET_PARAM index=0 type=MPT_SYMBOL |
|  | R_PUSH 16 |
|  | R_SHR |
|  | R_b16s5B4 |
| SHORI (s&0xFFFF), Rϕ | (program counter advances) |
|  | R_GET_PARAM index=0 type=MPT_SYMBOL |
|  | R_PUSH 0xFFFF |
|  | R_AND |
|  | R_b16s5B4 |
| LT_ENDIF | R_ENDIF |
| LT_ENDMACRO | R_EXIT_MACRO |
| SECTION .text,AX | .text and .relo.text sections are created |
| LT_DECLMACRO const_load(.SYM) | The number and types of parameter are associated with the LT macro name const_load by the assembler |
| IMPORT fred; | |
| const_load fred | R_PUT_PARAM MPT_SYMBOL fred |
|  | R_MACRO_CALL const_load |
|  | The program counter is incremented by 1 (marker byte inserted in .text section). |

The following description relates to the generation of call frame information in link-time optimized executables.

Program debuggers often need to be able to view and modify the state of any subroutine activation that is on a so-called "call stack." An activation consists of three elements:

1. A code location that is within the subroutine. This location is either the place where the program stopped when the debugger got control, or is a place where a subroutine made a call or was interrupted by an asynchronous event 2. An area of memory that is allocated on the call stack called a 'call frame.' The call frame is identified by an address on the call stack referred to as the "canonical frame address" (CFA).

3. A set of registers that are in use by the subroutine at the code location.

Typically, a set of registers are designated that are to be preserved across a call. To use such a register the value that the register had at entry time is saved in its call frame and is restored on exit. The code that allocates space on the call frame stack and performs the save operation is termed the prologue, whilst the code that performs the restore operation is termed the epilogue.

To be able to view or modify a function activation for debugging purposes it may be necessary for the debugger to "unwind" the stack. The unwinding operation needs to know where the registers are saved and how to compute the predecessors CFA and code location. The CFI instructions required to unwind the stack are stored in the executable program in a separate section called .debug_frame.

In embodiments of the present invention the .debug_frame section is generated by the linker after the final executable program section, .text, has been established. This approach allows the executable program to be optimized without destroying the ability to associate CFI to particular section data.

In embodiments of the present invention the assembler adds a sequence of special purpose relocations to the code relocation section, .relo.text, and these are used by the linker to generate the .debug_frame section. The assembler already has the ability to generate general-purpose relocations, so the CFI directives can be implemented entirely as assembler macros. Since encoding of the CH instructions is performed at link time, when all the operand values are known, the most efficient encoding can be used.

Figure 6:
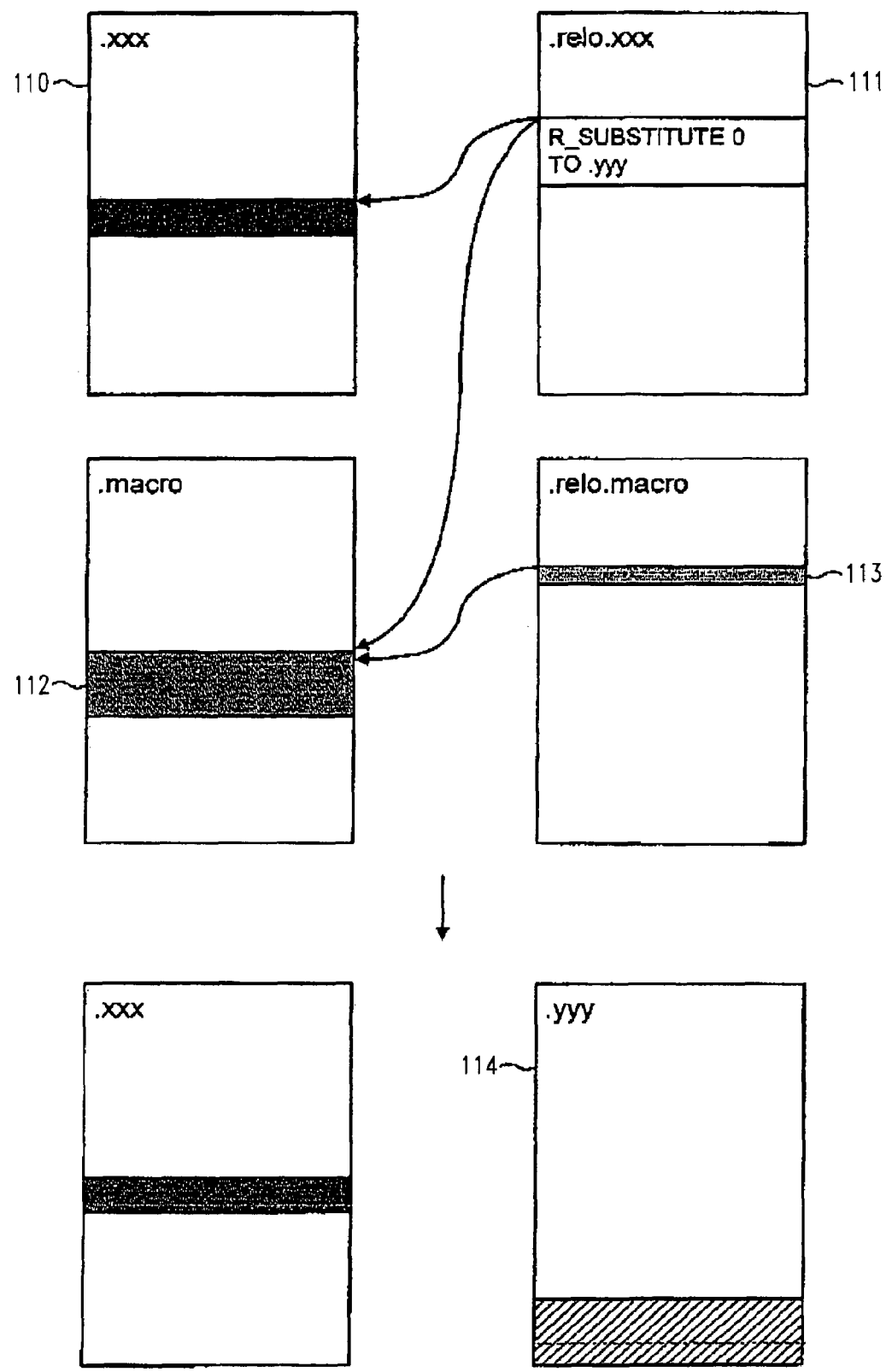
FIG. 6 is a schematic diagram showing the use of a divert macro relocation.
Figure 7:
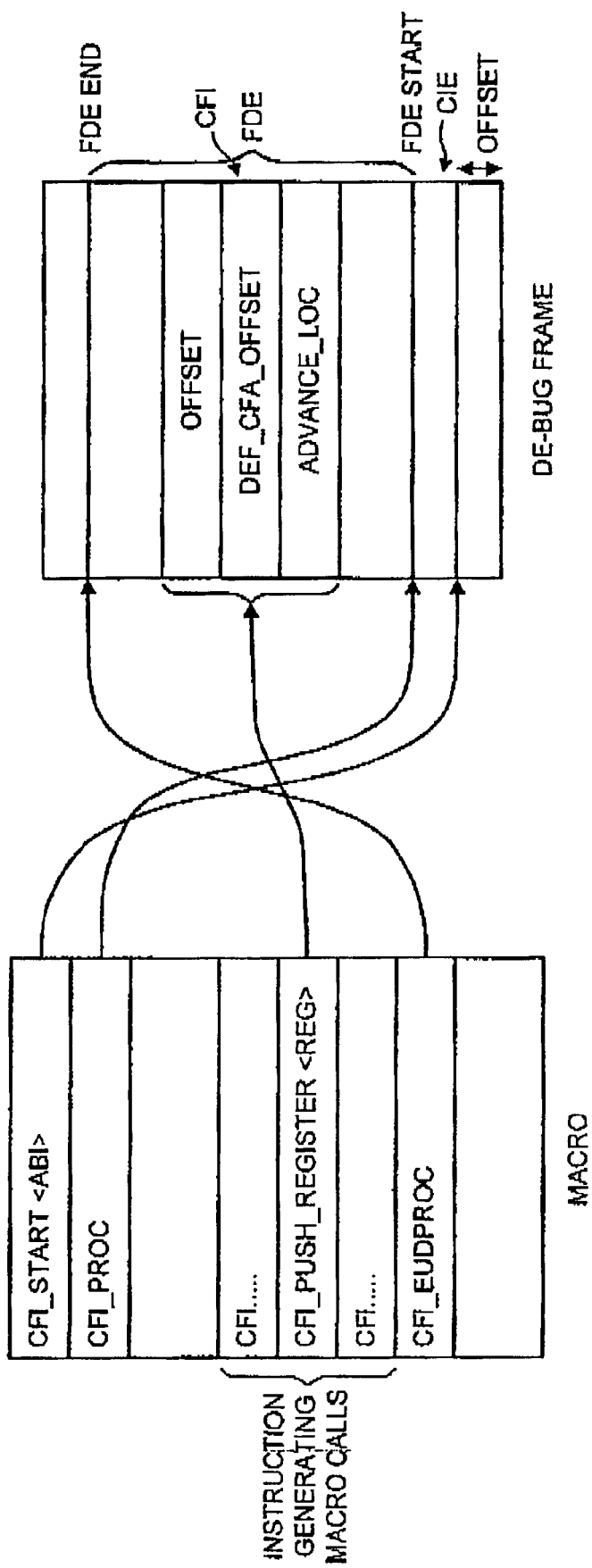
FIG. 7 is a more detailed schematic illustrating generation of a debug frame.

FIG. 6 schematically illustrates the method of generating the .debug_frame. To implement the method, rather than substituting the .macro bytes 112 patched by the .relo.macro section 113 back into the specified location in the .text section 110, they are substituted at the end of another section, in this case the .debug_frame section 114. To achieve this, one of the spare 32-bit arguments of the R_START_MACRO is used to refer to the destination section for the macro. FIG. 7 is a more detailed schematic illustrating how macro calls are used to generate debug_frame information, as described in more detail hereinbelow.

The scheme described herein allows users to create CFI for functions written in assembly language, so that a debugging session stopped in such a function can effectively unwind into the parent stack frame. It also allows post-compile-time optimizations to move and omit pieces of code without invalidating the CFI.

The following objectives are also achieved by embodiments of the invention.

1. Interoperability: object modules produced using a proprietary toolchain should be linkable with object modules produced using third-party toolchains, and the resulting executable should contain correct CFI.

2. Post-compile-time optimizations: the design should allow for the possibility of instruction rescheduling between compiling and linking, without invalidating the CFI.

3. Interrupt handlers: it should be possible to use the CFI to seamlessly back out of an interrupt handler.

CFI Generation by the Compiler

In one arrangement, CFI can be generated by the compiler. The compiler generates CFI directly into the .debug_frame section of the object module. The following describes CFI generation.

The compiler generates code that affects the stack frame in a limited number of well defined circumstances. These are:

1. on entry to a function;
2. on exiting a function;
3. before and after a function call;
4. when allocating space with alloca.

The compiler generates CFI instructions appropriate to each of these actions. In addition the compiler generates one Common Information Entry (CIE) per compilation unit, and one Frame Description Entry (FDE) per function, Function Entry As part of the function prolog, code may be generated to take the following actions, each of which requires CFI output:

1. if necessary. The parameters passed in registers are saved on the stack;
2. if any callee-save registers are used by the function, these are saved on the stack (only the callee-save registers actually used by the function are saved);
3. the stack frame is allocated, by subtracting its size from the stack pointer (the size of the stack frame is always known at compile-time);
4. if necessary, a frame-pointer is allocated by copying the stack pointer to a designated register at this point (only required if the function makes use of the C-library function alloca).

One embodiment pushes registers one at a time, using a single move with auto-decrement instruction.

Another embodiment allocates the entire stack frame in one hit, by adding a constant to the stack pointer, and then saves registers at fixed offsets from the new stack pointer.

It is also possible to allow a callee-save register to be saved by copying to another register.

Function Exit

A function may have more than one exit point, so the epilog code may appear in several places corresponding to different C return statements. CFI remember_state and restore_state instructions are used to avoid having to explicitly reconstruct the CFI state where control flow branches around a function epilog. These are the only CFI instructions that are not directly associated with a particular machine instruction (instead they bracket the epilog sequence), and this is the only circumstance in which they are used.

Function epilogs may take one or more of the following actions, each of which potentially requires CFI output:

1. if a frame pointer was allocated, restore the stack pointer to the same value;
2. de-allocate the stack frame (i.e., local variables) by adjusting the stack pointer by a constant amount;
3. restore any callee-save registers that were spilled on entry to the function;

4. discard any register parameters that were spilled, by adjusting the stack pointer by a constant amount.

At the end of the epilog sequence, the CFA offset is 0.

Callee-save registers are restored one at a time, using a single instruction for each in one embodiment. In another embodiment the registers from fixed offsets from the stack pointer are restored, then a single stack pointer adjustment for actions 2, 3 and 4 is performed in one hit.

Parameter Passing

If there is no active frame pointer, pushing parameters alters the canonical frame pointer (CFA) calculation by a fixed amount for each parameter. If there is an active frame pointer, the CFA calculation is unaffected so no CFI needs to be generated.

Similarly, on return from a function call the parameters are popped from the stack, and this requires CFI output only if there is no active frame pointer.

Parameter passing on the stack takes place by first adjusting the stack-pointer by a fixed amount (sufficient for all the non-register parameters), and then storing the parameters at fixed offsets from the new stack pointer. Only the stack-pointer adjustment requires CFI output.

After the called function returns, the caller de-allocates the stack used for parameters by again adjusting the stack pointer by a fixed amount, again requiring CFI output.

Functions that Call Alloca

The C-library function alloca allocates dynamic storage on the stack. The compiler does not know in advance how far the stack pointer will move as a result of calling this function. In functions that call alloca, the compiler reserves a register for use as a frame pointer, and copies the stack pointer to this register after allocating the function's fixed stack frame and before calling alloca. All references to variables held on the stack are then made via the frame pointer.

This has two implications for CFI: when the frame pointer is allocated, the CFA calculation must be changed to use the new register; and setting up parameters for a function call no longer requires CFI notification because the frame pointer is not affected by this operation.

CFI Generation

The CFI (or sufficient information to generate it) must be present in the object file after assembly, and it must be possible to adapt it appropriately to take account of link-time optimizations. The idea is to provide assembler macros (or directives) that stand for shod sequences of CFI instructions, each of which reflects the effect on the call frame of a single instruction, either in handwritten assembler or generated by the compiler.

Two alternative approaches are:

1. the assembler generates a .debug_frame section containing CFI data together with labels and standard relocations sufficient to ensure the validity of the section after linker optimization; or 2. the assembler adds a sequence of special-purpose relocations to the code relocation section, .relo.text, and these are used by the linker to generate the .debug_frame section after linking has established the final .text section.

Assembler Generates Relocatable CFI

In one approach, the assembler can be modified to generate the .debug_frame section given from directives (or macro calls defined in terms of lower-level directives) inserted into the assembly language source by the programmer or by the compiler.

The space required is at least one relocation (16 bytes) plus one label (16 bytes) per CFA_advance_loc instruction; that is, 32 bytes per compiler-generated group of CFI instructions.

Since the size of some operands to CFI instructions is not known until link time, the most efficient encoding is not available at assembly time. It may therefore be necessary to retain the most pessimistic encoding always, especially for advance_loc instructions, or perform radical restructuring of the already-generated CFI at link-time.

Linker Generates CFI from Relocations

In another approach, the linker can be modified. The assembler already has the ability to generate general-purpose relocations, so the CFI directives can be implemented entirely as assembler macros. This approach therefore requires changes to the linker, not the assembler.

The space required is one relocation (16 bytes) per CFI instruction or common group of CFI instructions. As an example, consider pushing a callee-save register. The CFI for this action consists of advance_loc, def_cfa_offset and offset instructions. This sequence might be generated by an assembler macro .CFI_PUSH_REGISTER.

To generate the CFI for this push action, we must know the value of the program counter the last time an advance_loc was output, the new CFA offset, and the register concerned.

There is no need to drop a label at the location of each machine instruction that affects the CFI so that advance_loc offsets can be calculated by standard relocations; instead the linker can maintain a single global variable that records (within the scope of a function) the location of the last instruction that caused the output of an advance loc CFI instruction.

The CFA offset can either be calculated knowing the previous CFA offset and the size of the register, or is given as a parameter to the macro call. Assuming a downwards-growing stack, the CFI will record that the saved register is to be restored from this new offset.

The only parameter that must be provided to the .CFI_PUSH_REGISTER macro is the name of the register. Ordinarily, an additional relocation is required to store this parameter somewhere where it is accessible to the linker macro, such as on the linker's evaluation stack; however, this can be achieved without an additional relocation by using a single compound relocation, which takes the (dwarf encoding on the register as an argument, and pushes it on the linker's stack before invoking the linker macro.

Since encoding of the CFI instructions is performed at link time, when all operand values are known, the most efficient encoding can be used.

The scheme satisfies the requirement to associate CFI directives tightly with individual instructions, which permits the possibility of instruction rescheduling. The association is clear in the assembly language: the .CFI_ . . . macro cal belongs to the preceding instruction, except in the case of remember_state and restore_state instructions which bracket a function epilog.

The following part of the description outlines the names and functions of the assembler macros required by embodiments of the present invention to generate the CFI in the linker. The effect of these macro calls is to insert calls to a library of linker macros into the .relo_text section of the object module. When the linker processes the .text section it will invoke these macros and the macros will construct a .debug_frame section containing the CFI. Entries in the .debug_frame section are aligned on an addressing unit boundary and come in two forms; a common information entry (CIE) and a frame description entry (FDE). A CIE holds information that is shared among many FDEs. There is at least one CIE in every .debug_frame. The linker macros must be able to generate a CIE, one FDE per function, and CFI instruction sequences.

The assembler macros for CFI generation are prefixed with .CFI_to minimize name space pollution.

CIE

The CIE is generated by the macro call:

.CFI START<ABI> where ABI stands for the toolchain in use. Subsequently generated FDEs will contain pointers to this CIE, to allow this the linker macro creates a link time symbol cie containing the offset of the CIE from the start of the .debug_frame section.

If more than one CIE is required per compilation unit multiple occurrences of the .CFI_START macro will be permitted, each one remaining in force until overridden by a subsequent one.

FDE

One FDE is generated per function. The FDE contains a length field that includes the length of all the CFI instructions generated for the function. The FDE is defined by a pair of macros that indicate the start and end of a function:

.CFI_PROC

.CFI_ENDPROC

Together the pair of macros will generate an FDE, taking the start address to be the location of the .CFI_PROC macro and the range to be the difference between this and the location of the .CFI_ENDPROC macro. The CFI instructions generated by all intervening CFI macros will be considered part of this FDE.

The linker will allocate a global variable unique to each procedure, in which the total length of the FDE is stored by the .CFI_ENDPROC macro. On a subsequent linker pass, an FDE will be created using the correct length stored in this variable.

Each FDE will then point to the CIE in force when it is generated. If required, CIE generating macros can be created for special-purpose ABIs, following the example of the standard one.

Apart from static version information, the CIE contains code and data alignment factors, the name of the return address register, and the initial state of all machine registers (i.e., whether they are caller-save or callee-save). Most of this information is determined by the AbI for the language. In this scheme, knowledge of the various AbIs is contained in a macro library where it can more easily be changed or substituted, instead of being hard-coded into an assembler directive.

The CIE macro will store the code and data alignment factors in linker variables, so they can be used in subsequent calculations.

The CIE has a length field; for a given ABI, this length is statically known and does not need to be calculated.

As a space optimization, it may be possible to have one CIE per ABI used in a compilation unit, rather than one CIE per call of .CFI_START. An invocation of .CFI_START could check for the prior existence of a CIE for the given ABI, and if found, set the active CIE to point to it instead of generating a new one.

The FDE also contains the initial location and length of the function code; these can be calculated from the locations of the .CFI_PROC and .CFI_ENDPROC calls.

Call Frame Adjustments

In the present embodiments no more than one macro call should be needed to define the CFI effect of a single machine instruction. The set of macros defined in this section cover all the code sequences generated by the compiler, and are probably sufficient for almost everything that can be expressed in the CFI.

Every one of these macros begins by outputting an advance_loc instruction to move the CFI location to the current program counter. The argument to advange_loc is the number of machine instructions since the last time the CFI location was defined. To calculate this value, the linker must remember the program counter from the last time an advance_loc was issued. A single global variable is sufficient for this.

Adjust CFA Offset

Two forms are provided, absolute and relative:

.CFI_SET_CFA_OFFSET <offset>

.CFI_ADJ_CFA_OFFSET <adjustment> where <offset> and <adjustment> are 32 bit signed integers. The first form sets the CFA offset to the given value and the second adds its argument to the current CFA offset.

The second form does not correspond directly to a CFI instruction, but is provided for convenience. In the DWARF2 CFI all offsets are absolute, so the linker must keep an account of the offset in order to apply a relative adjustment; this relieves the programmer of the responsibility, and also permits a convenient form for the push macro below. Relative adjustments also allow stack pointer changes to make sense inside linker conditionals.

Note that the offset is not divided by the data alignment factor held in the current CIE before it is stored in the CFI, DWARF2 specifies an unsigned offset, so the CFA is always a higher address than the stack (or frame) pointer (where it is based on an offset calculation).

On most modern architectures, increasing the size of the stack frame requires a negative adjustment to the stack pointer since the stack grows downwards; thus the value subtracted from the stack pointer will be added to the CFA offset. A typical code sequence would be:

ADDI #-4, SP; CFA offset is already 4 here

.CPI_SET_CFA 8 or:

ADDI -4, SP

.CFI_ADJ_CFA 4; the CFA is now 4 bytes further away from SP

Note that where the stack pointer is to be adjusted by a value too large to fit into the immediate data field of an instruction, the compiler may choose to use a sequence of add immediate instructions that accumulate to give the required adjustment. To product correct CFI, each such instruction must be followed by an appropriate CFA adjusting macro call.

Change CFA Register

The CFA register may change, for example if a frame pointer is allocated.

.CFI_SET_CFA_REGISTER <register>

.CFI_SET_CFA <register>, <offset> the first form records that the CFA register has changed but does not affect the offset. The second form allows both the CFA register and offset to be changed by a single machine instruction.

Save and Restore Register at Offset from CFA

.CFI_STORE_REGISTER_ABS <register>, <offset>

.CFI_STORE_REGISTER_REL <register>, <rel_offset>

.CFI_COPY_REGISTER <register>, <register>
.CFI_RESTORE_REGISTER <register>

Except for the last, these macros all generate CFI instructions to record that a register has been saved in a given location or restored to the value it held in the parent stack.

The macro .CFI_STORE_REGISTER_ABS records that the named register is saved at the given (absolute) offset from the CFA (offset in bytes). The macro .CFT_STORE_REGISTER_REL records that the named register is stored at the given offset from the register used in the CFA calculation, typically the stack pointer or frame pointer. This is useful because the associated machine instruction will normally be a store at this offset from this register, so the relative offset is readily available; to use the absolute form it is necessary to know the current CFA offset, which is awkward in assembler inserts for example.

The macro .CFI_COPY_REGISTER records that the given register has been saved by copying to another register.

The macro .CFI_RESTORE_REGISTER <register> records that the rule for the named register has been restored to the default rule for this register in the CIE; if the register is callee-save, this implies it has been restored to the value it held in the parent stack frame.

In all these macros the specified register should be callee-save, which means its initial state in the CIE is same-value.

Push & Pop Register

These macros save the register and adjust the stack in a single instruction:
.CFI_PUSH_REGISTER <register>
.CFI_POP_REGISTER <register>

The CFA offset is adjusted by the size of the specified register and the register is recorded as having been saved at offset zero from the current stack pointer, or restored, respectively.

Function Epilogue

Function epilogues are bracketed by:
.CFI_REMEMBER_STATE
.CFI_RESTORE_STATE

These macros simply output the CFI instructions of the same name after advancing to the current location.

Interoperability

There are two interoperability requirements:

1. it should be possible to include object modules with a standard .debug_frame section and only standard relocations (no link-time optimization) in a link with object modules using the CFI generation mechanism proposed here, and obtain the expected results, using a modified linker;

2. there should be a procedure that allows object modules generated by the toolchain to be linked by a dumb linker, that is, a linker that expects to make use of only the sections described in the ELF specification.

The first requirement is satisfied provided the linker retains all the pre-existing .debug_frame sections it finds in the objects being linked, and appends any CFI generated from relocations to the end of the pre-existing CFI.

Satisfying the second requirement is more complex but can be achieved by generating an interoperable module using the linker in a special-purpose mode. This mode would perform a partial link of the object module, and in doing so generate a suitable .debug_frame section from a verbatim reading of .text.

Post Compile-time Optimization

It is possible that optimizations that move instructions around may need to be performed after the CFI annotations have been added. An example would be instruction rescheduling by an optimizing assembler, clearly this operation should not invalidate any associated CFI. A preliminary analysis of this problem suggests the following considerations are important.

1. There is a coupling between a CFI annotation and the (preceding) instruction it describes, except in the case of .CFI_REMEMBER_STATE and .CFI_RESTORE_STATE which conceptually bracket a function epilogue. If the instruction is moved, the annotation goes with it.

2. Relative CFI macros should be used wherever possible; in most cases these can be moved past each other without becoming incorrect. For example, two push operations can be exchanged and will still generate correct CFI, whereas the same instructions described by .CFI_SET_CFA_OFFSET annotations must remain in the same order.

3. Instructions with CFI annotations cannot be moved into or out of function epilogues.

The syntactic representation of the CFI in assembler source language is independent of its implementation via linker macros. It will be straightforward for a future assembler to provide the same facility via directives instead of macros, so that the assembler can have explicit knowledge of the semantics of the CFI annotations. An optimizing assembler will need to include debug information in its internal representation of the instruction sequence.

If necessary, an even tighter coupling between instructions and CFI might be provided by implementing CFI-generating versions of all instructions that might affect the call-frame.

Assembler Inserts

It should be possible to write CFI generating macros directly in assembler inserts in C programs, and the effect should be as expected. Note that relative CFA adjustments and relative register stores make CFI generation in inserts practical, since the absolute CFA offset in use across the insert is not known and may change from compilation to compilation, for example with the optimization level.

Examples of Link-time CFI Generation

Macro relocations as described above can be used for the generation of Call Frame Information. Since code is included in or excluded from the executable on the basis of calculations made at link-time, the value of the program counter (and potentially the value of the CFA offset) at each point in the program is not available until after these calculations have been performed. Note that the CFI is encoded in such away that the size of each instruction depends on the values encoded within it. It is therefore easier to generate the CFI during linking when all values are known, than to generate it at compile time and repair it subsequently to take account of conditional code inclusion.

Since the CFI is stored in the .debug_frame section of the final executable, but depends mostly on properties of the .text section, it is convenient to generate it using diverted macro relocations attached to the .text section.

The Implementation of .CFI_PUSH_REGISTER

The .CFI_PUSH_REGISTER macro generates CFI to record that a callee-save register has been saved on the stack at this point in the program. The link-time portion of this macro is invoked with two parameters, held in linker dynamic memory: parameter (1) is the location in section .text at which the macro was invoked, and parameter (2) is (the number of) the register concerned.

The result of executing the macro is the generation of 3 CFI instructions that represent the change: first, DW_CFA_advance_loc instruction, that encodes the change in the program counter since the last CFI event; second a DW_CFA_def_cfa_offset instruction that encodes the change in the stack pointer due to pushing a register; and finally a DW_CFA_offset instruction that encodes the stack location at which the saved register is stored.

Generating DW_CFA_advance_loc

The first step is to calculate the change in location since the last CFI event, and update the linker variable that stores the location of the last event.

```
Temp := (parameter(1) − last_cfi_loc)/code_alignment_factor
last_cfi_loc :=
    parameter (1)
```

Now that the location change is held in linker variable temp, a suitable encoding for the instruction can be found.

```
LT_IF (temp !=0) & (temp & ~0x3f) == 0
    BYTE DW_CFA_advance_loc | temp
LT_ENDIF
LT_IF ((temp & ~0x3f) !=0 ((temp & ~0xff) == 0)
    BYTE DW_CFA_advance_loc1
    BYTE temp
LT_ENDIF
LT_IF ((temp & ~0xff) !=0 ((temp & ~0xffff) ==0)
    BYTE DW_CFA_advance_loc2
    INT2 temp
LT_ENDIF
LT_IF (temp & ~0xffff) !=0
    BYTE DW_CFA_advance_loc4
    INT4 temp
LT_ENDIF
```

The effect of this conditional is to output one, two, three or five bytes into .debug_frame depending on the value in temp.

Generating DW_CFA_def_cfa_offset

Assuming the size of the register being pushed is 4 bytes, the stack pointer will be moved down by 4, and thus its offset from the fixed CFA will increase by 4. The macro first updates the offset value, stored in linker variable cfa_offset. It then outputs the CFI instruction:

cfa_offset:=cfa_offset+4
BYTE DW_CFA_def_cfa_offset
LT_ULEB128 cfa_offset

The second line outputs the instruction's opcode. The third invokes a secondary linker macro that encodes its argument as an unsigned LEB128 sequence. The effect is to output one, two, three, four or five bytes into debug_frame depending on the new value of cfa_offset.

Generating DW_CFA Offset

This instruction records the register pushed, and its position on the stack. The first step is to find a suitable encoding for the instruction based on the register number; if too big, an extended form is required.

```
LT_IF (parameter (2) & ~0x3f) == 0
    BYTE DW_CFA_offset | parameter (2)
LT_ENDIF
LT_IF (parameter (2) & ~0x3f) !=0
    BYTE DW_CFA_offset_extended
    LT_ULEB128 parameter (2)
LT_ENDIF
```

This sequence normally generates between one and three bytes (since register numbers are not likely to need more than two bytes of encoding). Now the CFA offset is encoded as a ULEB128 sequence of up to five bytes.

LT_ULEB128 (0~cfa_offset)/data_alignment_factor

It is interesting to note that the minimum size of the three instruction sequence (and hence the minimum number of bytes written to .debug_frame) is 5 bytes, whereas the largest sized sequence that is likely to occur in practice is 13 bytes or so.

TABLE 4

```
typedef struct {
    Elf32_Adr r_offset;
    unsigned char r_class;
    union    {
            struct    {
                    unsigned char bits;
                    unsigned char bitstart;
                    unsigned char bytes;
                    } bit;
            struct    {
                    unsigned char reltype;
                    unsigned char subtype1;
                    unsigned char subtype2;
                    } nonbit;
            } r;
    Elf32_Word r_arg1;
    Elf32_Word r_arg2;
} Elf32_Relo;
```

TABLE 5

| Relocation Type Name | reltyp | Meaning (C syntax is assumed) |
|---|---|---|
| R_NONE | 1 | No action is performed. |
| R_NOOPTIMISE | 2 | Optimization will be turned off from r_offset |
| R_OPTIMISE | 3 | Optimization will be turned on from r_offset |
| R_PROC | 4 | Marks start of PROC. One marker byte is inserted at r_offset |
| R_ENDPROC | 5 | Marks end of PROC |
| R_MAX (signed) | 6 | tos=(arg1>arg2?arg1:arg2) |
| R_OR | 7 | tos=(arg1|arg2) |
| R_XOR | 8 | tos=(arg1?↑arg2) |
| R_AND | 9 | tos=(arg1&arg2) |
| R_EQ | 10 | tos=(arg1==arg2) |
| R_NE | 11 | tos=(arg1!=arg2) |
| R_GT | 12 | tos=(arg1>arg2) |
| R_GE | 13 | tos=(arg1>=arg2) |
| R_LT | 14 | tos=(arg1<arg2) |
| R_LE | 15 | tos=(arg1<=arg2) |
| R_SHR | 16 | tos=(arg1>>arg2) note: arithmetic shift |
| R_SHL | 17 | tos(arg1<<arg2) |
| R_ADD | 18 | tos = (arg1+arg2) |
| R_SUB | 19 | tos=(arg1−arg2) |
| R_MUL | 20 | tos=(arg1*arg2) |
| R_DIV | 21 | tos=(arg2/arg2) note: undefined if arg2==0 |
| R_REM | 22 | tos=(arg1%arg2) note: undefined if arg2==0 |
| R_PC | 23 | tos<−P |
| R_INV | 25 | tos=−tos |
| R_REL | 26 | tos<−O |
| R_SIZE | 27 | tos<−Sz section size |
| R_PUSH | 28 | tos<−symbol attribute or value s1 holds flag saying which symbol attribute/value to be pushed. |
| R_DUP | 29 | tos<−tos (duplicates the top of stack) |
| R_IF | 30 | if (!tos)section data is skipped |
| R_IF_FIXED | 31 | Worst case branch (only for .macro). |
| R_ELSE | 32 | see R_IF (not supported in .macro). |
| R_ENDIF | 33 | see R_IF |
| R_START_MACRO | 34 | Informational, for error checking. |

TABLE 5-continued

| | | |
|---|---|---|
| R_EXIT_MACRO | 35 | Linker stops inserting section data at r_offset |
| R_PUT_PARAM | 36 | s1 holds index, s2 holds type information; the linker associates r_arg with these |
| R_GET_PARAM | 37 | s1 holds index, s2 holds type information; the linker retrieves the value associated with these |
| R_STORE | 38 | s1 holds index; the linker associates the value r_arg with the index for retrieval via R_FETCH |
| R_FETCH | 39 | s1 holds index; the linker retrieves the value associated with the index |
| R_MACRO_CALL | 40 | r_arg1 is a symbol in macro section whence to insert section data. One marker byte is present at r_offset. |

| Key | |
|---|---|
| s1,s2 | Mean the r.nonbit.subtype1,2 field of the relocation. |
| S | Means the sum of r_arg1 and r_arg2 after interpreting them as symbol values or constant values according to RC_ARG1/2. |
| So | The value of symbol's st_other field. |
| O | Means the offset, relative to the base of the containing section, of the relocation entry symbol. |
| P | The absolute address of the relocation entry, r_offset (i.e., the PC). |
| Sz | Means the size of the relocation entry symbol's defining section. |
| tos | Top-of-stack, the value at the top of the internal linker stack |
| tos <- | Pushes a 32-bit signed value onto the internal linker stack. |
| tos=arg1 op arg2 | If both RC_ARG1 and RC ARG2 are RC_UNUSED then both the arguments are assumed to be on the stack (with arg1 pushed first). Otherwise arg1 is S (i.e., the symbol value +addend) and arg2 is tos. The argument(s) on the stack are popped and the operation indicated as op is performed. Finally the result is pushed on the stack. |

All of the above U.S. patents, U.S. patent application publications, U.S. patent applications, foreign patents, foreign patent applications and non-patent publications referred to in this specification and/or listed in the Application Data Sheet, including but not limited to European Patent Application No. 01306398.7, filed on Jul. 26, 2001; U.S. patent application Ser. No. 09/872,475, filed on Jun. 1, 2001, and entitled "FORMING AN EXECUTABLE PROGRAM;" and U.S. patent application Ser. No. 10/032,155, filed on Dec. 20, 2001, and entitled "RETRIEVAL OF SYMBOL ATTRIBUTES," are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of linking a plurality of object code modules to form an executable program, each object code module comprising sets of section data and associated section data relocation instructions, at least one of said modules further comprising a macro section containing information sequences associated with one or more of said sets of section data and macro relocation instructions associated with said macro section, wherein said information sequences include call frame information macros from which a sequence of call frame information instructions are derivable as a modified information sequence for constructing a debug frame of said executable program, and wherein said section data relocation instructions include at least one divert macro call relocation instruction identifying a location of one of said information sequences in said macro section, the method comprising, at link time:
reading said sets of section data and section data relocation instructions;
executing said relocation instructions on said associated sets of section data to modify said section data to generate program code sequences and inserting said program code sequences into a first portion of said executable program, wherein said method further comprises:
on reading a divert macro call relocation instruction identifying the location of said information sequence in the macro section, executing said associated macro relocation instructions on said associated information sequence to modify said information sequence; and
constructing said debug frame of said executable program with said call frame information macros therein.

2. A method according to claim 1, wherein said information sequences each include a common information entry macro which defines an entry point into the debug frame.

3. A method according to claim 2, wherein the entry point into the debug frame is held as a link time symbol containing offset information of the entry point from the start of the debug frame.

4. A method according to claim 3, wherein the common information entry point further includes code and data alignment factors.

5. A method according to claim 4, wherein the common information entry point further includes information identifying a return address register.

6. A method according to claim 5, wherein the common information entry point further defines the initial state of machine registers.

7. A method according to claim 6, wherein said information sequence includes a frame description entry macro which defines the length of call frame information instructions generated for each function.

8. A method of generating an object code module for linking with other object code modules to form an executable program, the method comprising:
generating sets of section data and associated section data relocation instructions;
generating a macro section containing information sequences associated with one or more of said sets of section data and macro relocation instructions associated with said macro section, including generating at least one divert macro call relocation instruction identifying a location of one of said information sequences in said macro section,
wherein each information sequence in the macro section constitutes skeleton information for generating a set of call frame information instructions, and
constructing a debug frame of an executable program at link time with said call frame information instructions therein.

9. A method according to claim 8, wherein said information sequences each include a common information entry macro which defines an entry point into the debug frame.

10. A method according to claim 9, further comprising: holding the entry point into the debug frame with a link time symbol containing offset information of the entry point from the start of the debug frame.

11. A method according to claim 9, wherein the common information entry point further includes code and data alignment factors.

12. A method according to claim 9, wherein the common information entry point further includes information identifying a return register.

13. A method according to claim 9, wherein the common information entry point further defines the initial state of machine registers.

14. A method according to claim 8, wherein said information sequence includes a frame description entry macro which defines the length of call frame information instructions generated for each function.

15. A computing system having a processor for linking a plurality of object code modules to form an executable program, each object code module comprising sets of section data and associated section data relocation instructions, at least one of said modules further comprising a macro section containing information sequences associated with one or more of said sets of section data and macro relocation instructions associated with said macro section, wherein said section data relocation instructions include at least one divert macro call relocation instruction identifying a location of one of said information sequences in said macro section, the linker comprising:

an instruction reader for reading said sets of section data and section data relocation instructions; and means for executing said relocation instructions on said associated sets of section data to modify said section data to generate program code sequences and for inserting said program code sequences into a first portion of said executable program, wherein said instruction reader comprises means for detecting a divert macro call relocation instruction identifying the location of said information sequence in the macro section, operable to execute said associated macro relocation instructions on said associated information sequence to generate a sequence of call frame instructions; and constructing a debug frame of said executable program at link time with said call frame instructions therein.

16. A computing system according to claim 15, which comprises means for reading a common information entry macro in said information sequences which defines an entry point into the debug frame, and for inserting the call frame information instructions into the debug frame at said entry point.

17. A computing system according to claim 15, which comprises means for reading a frame description entry macro in the information sequences which defines the length of call frame information instructions generated for each function.

18. A computer-readable storage medium storing instructions which when executed by a computing system cause the computing system to link a plurality of object code modules to form an executable program, each object code module comprising sets of section data and associated section data relocation instructions, at least one of said modules further comprising a macro section containing information sequences associated with one or more of said sets of section data and macro relocation instructions associated with said macro section, wherein said section data relocation instructions include at least one divert macro call relocation instruction identifying a location of one of said information sequences in said macro section, comprising:

at link time, reading said sets of section data and section data relocation instructions;

at link time, executing said relocation instructions on said associated sets of section data to modify said section data to generate program code sequences and inserting said program code sequences into a first portion of said executable program, wherein said method further comprises:

at link time, on reading a divert macro call relocation instruction identifying the location of said information sequence in the macro section, executing said associated macro relocation instructions on said associated information sequence to modify said information sequence and to generate a sequence of call frame instructions; and at link time, constructing a debug frame of said executable program with said call frame instructions therein.

19. A computer-readable medium according to claim 18 for causing a computing system to link a plurality of object code modules to form an executable program, further by, at link time:

reading a common information entry macro in said information sequences which defines an entry point into the debug frame, and inserting the call frame information instructions into the debug frame at said entry point.

20. A computer-readable medium according to claim 18 for causing a computing system to link a plurality of object code modules to form an executable program, further by, at link time:

reading a frame description entry macro in the information sequences which defines the length of call frame information instructions generated for each function.

* * * * *